ate of Patent: Jun. 13, 1989

United States Patent [19]
Willms

[11] Patent Number: 4,837,915
[45] Date of Patent: Jun. 13, 1989

[54] METHOD OF BREAKING BEARINGS

[75] Inventor: Richard G. Willms, Griswold, Iowa

[73] Assignee: James D. Welch, Omaha, Nebr. ; a part interest

[21] Appl. No.: 140,656

[22] Filed: Jan. 4, 1988

[51] Int. Cl.$^4$ ............................................. B23P 19/04
[52] U.S. Cl. ................... 29/426.4; 29/276; 225/103; 269/156; 269/249
[58] Field of Search .......... 29/254, 275, 276, 148.4 A, 29/148.4 B, 426.4; 225/1, 103; 269/156, 249

[56] References Cited

U.S. PATENT DOCUMENTS

| 1,589,085 | 6/1926 | Anderson et al. | 269/249 X |
|---|---|---|---|
| 1,984,960 | 8/1934 | Beard | 254/104 |
| 3,998,201 | 12/1976 | Miura et al. | 225/103 X |
| 4,233,730 | 2/1980 | Godbe | 29/727 |
| 4,279,067 | 7/1981 | Jenks | 225/103 X |
| 4,647,231 | 7/1987 | Harsdorff | 384/560 |

FOREIGN PATENT DOCUMENTS

| 552421 | 12/1956 | Italy | 269/156 |
|---|---|---|---|
| 391229 | 12/1973 | U.S.S.R. | 225/103 |
| 1415605 | 11/1975 | United Kingdom | 225/103 |

Primary Examiner—Howard N. Goldberg
Assistant Examiner—Andrew E. Rawlins
Attorney, Agent, or Firm—James D. Welch

[57] ABSTRACT

A system and method for use in quickly and easily removing bearings or collars from shafts, without damaging the shafts, is disclosed. The system comprises a frame to which are attached a slider and breaking point members, which slider and breaking point members can be adjusted to accept bearings or collars of varying sizes, and contain them in a stable manner so that a force can be imparted to the breaking point members, thereby causing the bearing or collar to break and be removed from the shaft to which it was mounted. The system is constructed to allow replacement of the slider, breaking point members and other elements, for instance when they become worn through use.

2 Claims, 1 Drawing Sheet

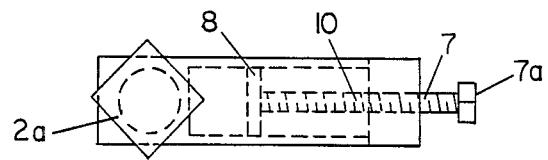
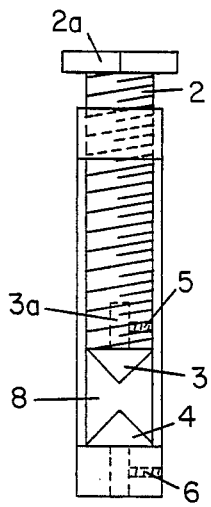
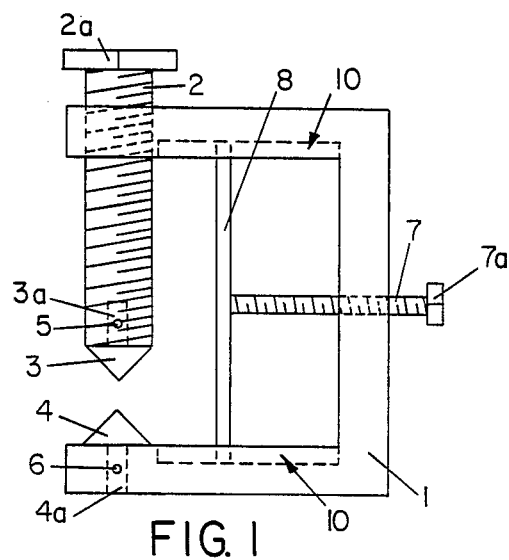
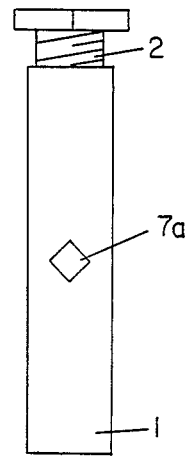
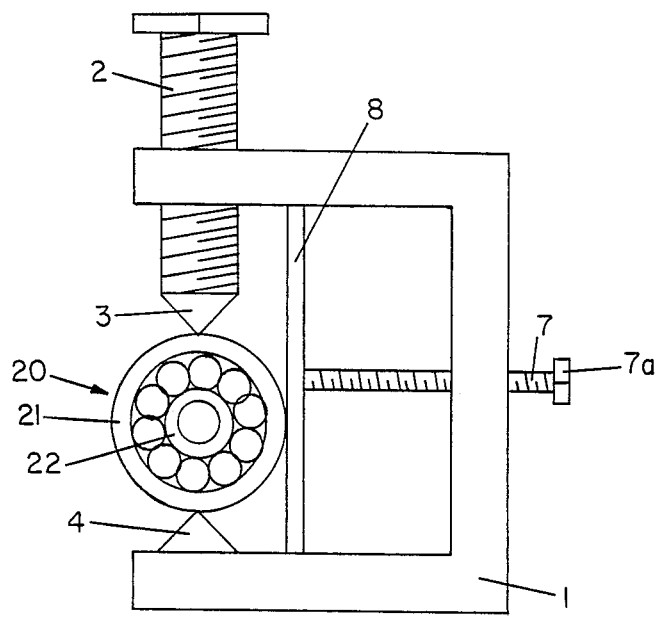

METHOD OF BREAKING BEARINGS

The subject matter of this application was disclosed in Disclosure Document 175,639.

TECHNICAL FIELD

This invention relates to apparatus which is useful in removing bearings and collars from shafts and in particular to a device, and method of its use, for easily and simply breaking bearings and collars from a shaft, to free a shaft for the receipt of a new bearing.

BACKGROUND

Since the introduction of the use of bearings and collars in mechanical equipment, those assigned the task of maintaining bearing and collar containing equipment have been faced with the problem of how to remove bearings and collars from a shaft, without damaging the shaft. A patent to Beard, U.S. Pat. No. 1,984,960, teaches a device which is useful in removing bearings which are arranged in pairs from a shaft, without damaging the bearings or shaft upon which they are mounted. The device operates by wedging between the pair of bearings and forcing them apart. Successively larger wedges are used to effect the removal of the bearings. The shortcoming of the Beard device is that it is does not provide for removing single bearings from a shaft, or for fast removal of a bearing when speed, rather than preservation of the bearing, is of primary concern. A patent to Harsdorff, U.S. Pat. No. 4,647,231, teaches a device which is useful in disassembling a multiple row tapered bearing, but the purpose of the invention is to provide a means to repair a special type of bearing, rather than quickly and easily remove any type of bearing from the shaft it is mounted upon.

A need exists for a device which provides a means to quickly and easily remove bearings and collars from a shaft upon which they are mounted, without causing damage to the shaft.

DISCLOSURE OF THE INVENTION

The present invention meets the need identified in the Background section. The present invention comprises a frame, with an adjustable slide attached to the frame which allows positioning a bearing or collar within the frame, so that a mechanism, also attached to the frame, can position breaking point members on opposite sides of a bearing or collar, and then be caused to break the bearing or collar by imparting a force with a hammer or hammer-like device.

SUMMARY OF THE INVENTION

Examination of the prior art shows that the problem mechanics face in removing bearings and collars from shafts upon which they are mounted is documented. Prior inventors have produced inventions which aid with removal and repair of bearings in a fashion that does not damage the bearings or the shaft upon which they are mounted. Said prior inventions, however, have rather limited application to multiple bearing configurations or to specific types of bearings etc. A need is found to exist for a general purpose device capable of removing single bearings or collars of varying designs from shafts upon which they are mounted.

The present invention provides a device, the use of which allows the breaking of a bearing collar, and the quick and easy removal of same from a shaft upon which it is mounted, without damaging the shaft. The present invention does not preserve the bearing or collar, but rather requires it to be replaced. The utility of the present invention lies in the ease with which it can be used and the speed with which bearings and collars can be removed from a shaft, so that they can be replaced.

The purpose of the new invention is to provide a device, and method of its use, which allows quick and easy removal of bearings or collars from shafts without damaging the shafts from which the bearings or collars are removed.

BRIEF DESCRIPTION OF THE DRAWINGS

FIG. 1 shows a front elevational view of the invention.

FIG. 2 shows a top view of the invention.

FIG. 3 shows a left side elevational view of the invention.

FIG. 4 shows a right side elevational view of the invention.

FIG. 5 shows a front elevational view of the invention with a bearing mounted therein.

DETAILED DESCRIPTION

Referring now to FIG. 1 it is shown that the invention comprises a frame (1) to which are attached a slider (8) and adjustment bolt (7)(7a) and breaking point member (4). Breaking point member (4) is attached to the frame (1) by means of a set screw (6) which engages rod (4a), which rod (4a) extends extends from breaking point member (4). Breaking point (3) is attached to bolt (2)(2a) by means of set screw (5) which engages rod (3a), which rod (3a) extends from breaking point member (3). Set screws (5) and (6) access rods (3a) and (4a) respectively through threaded holes in bolt (2)(2a) and frame (1) respectively. Bolt (2)(2a) enters the frame (1) through a threaded hole and by turning bolt (2) via bolt head (2a), the breaking point member (3) can be adjusted up or down. In use bolt (2)(2a) is adjusted to effectively clamp a bearing or collar between breaking point members (3) and (4), while bolt (7)(7a), which enters the frame (1) through a threaded hole and engages a slider (8), is adjusted, via its head (7a), to position slider (8) against the bearing or collar as a stabilizer. Slider (8) engages frame (1) through slots (10). See FIGS. 2, 3, and 4 for side and top views of the invention. Note that frame (1) is shaped like a piece of channel iron in cross section.

When a bearing or collar is secured between breaking point members (3) and (4), and slider (8), the head (2a) of bolt (2)(2a) can be hit with a hammer, or hammer-like device (not shown), with the effect being that the secured bearing or collar will break. FIG. 5 shows a bearing (20) in position for the breaking of its outer ring (21). Once outer ring (21) is broken, access can be had to inner ring (22). When inner ring (22) is cracked, the entire bearing will have been removed.

It is important to note that breaking point members (3) and (4), and the slider (8), as well as bolts (2)(2a) and (7)(7a) can be removed from the frame (1) and replaced if necessary, for instance when they become worn through use.

The present invention allows quick and easy removal of bearings or collars from shafts to which they are mounted, without damaging the shafts.

Having hereby disclosed the subject matter of this invention, it should be obvious that many modifications, substitutions, and variations of the present invention are possible in light of the teachings. It is therefore to be understood that the invention may be practiced other than as specifically described, and should be limited in breadth and scope only by the claims.

I claim:

1. A method of removing bearings, having inner and outer rings, or collars from shafts comprising:

obtaining a device for use in removing bearings or collars from shafts, said device comprising a frame to which is attached a slider, which slider is attached to a slider mechanism, which slider mechanism can be adjusted to set said device for use in removing bearings or collars of different sizes from shafts; and to which frame is attached mechanisms by which breaking point members can be positioned at opposite sides of a bearing or collar such that force can be imparted to a bearing by way of the breaking point members to cause the bearing or collar to break and thereby be removed from the shaft, at least one of said mechamisms being a bolt to which a breaking point member is attached;

placing a bearing or collar into the device for use in removing bearings or collars from shafts and adjusting the slider mechanism and breaking point member mechanism so that the slider and breaking points firmly contain the outer ring of a bearing, or a collar, the slider being to one side of the bearing or collar and the breaking point members being at the top and bottom positions; and hitting the bolt to which one breaking point member is attached to impart a force on the outer ring of the bearing, or to a collar, to cause to outer ring of the bearing, or the collar, to break.

2. A method of removing bearings or collars from shafts, as in claim 1, which further comprises:

repeating the steps of claim 1, on the inner ring of the bearing to completely remove the bearing from the shaft.

* * * * *